March 11, 1941.   D. L. WOOD   2,234,716
VIEW FINDER FOR CAMERAS
Filed Dec. 30, 1938   2 Sheets—Sheet 1

Inventor
Donald L. Wood

March 11, 1941.                D. L. WOOD                2,234,716
VIEW FINDER FOR CAMERAS
Filed Dec. 30, 1938           2 Sheets-Sheet 2
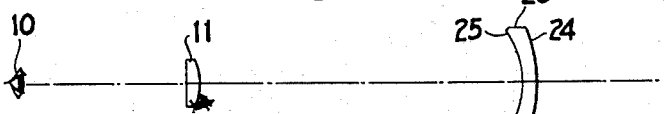
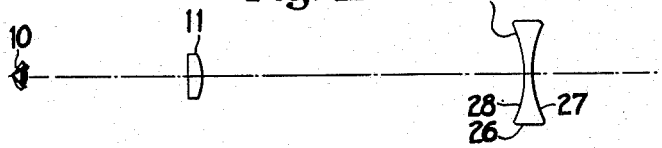
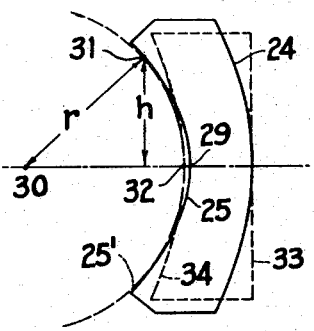
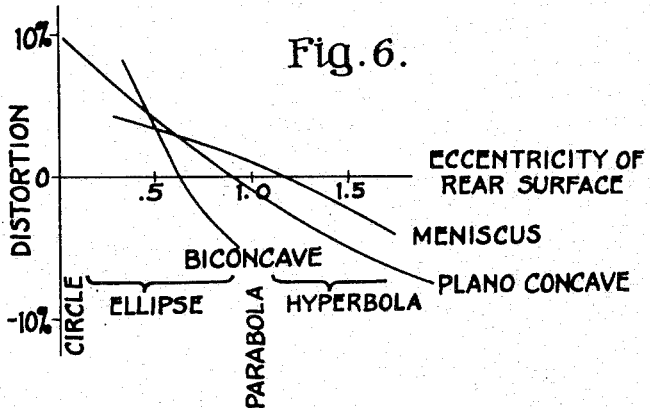
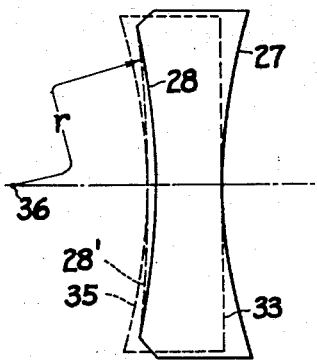
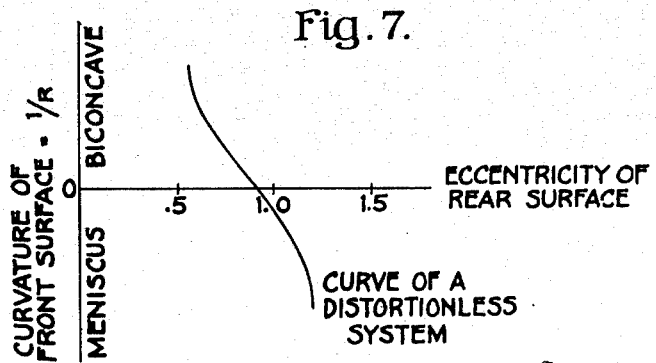
Inventor
Donald L. Wood
By
Attorneys Patented Mar. 11, 1941

2,234,716

UNITED STATES PATENT OFFICE 2,234,716

VIEW FINDER FOR CAMERAS

Donald L. Wood, Rochester, N. Y., assignor to Eastman Kodak Company, Rochester, N. Y., a corporation of New Jersey Application December 30, 1938, Serial No. 248,452

5 Claims. (Cl. 88—1.5)

This invention relates to optical systems and particularly to view finder systems suitable for use with photographic cameras.

This application is a continuation in part of my application Serial Number 167,992 filed October 8, 1937.

It is an object of the invention to provide a simple but highly corrected view finder of the inverted Galilean telescope type.

It is a particular object of the invention to provide a view finder of this type free from distortion.

The use of aspherical surfaces to correct lens aberrations has been suggested in a more or less general way and in the case of spherical aberrations the exact form of such a correcting surface is known for certain lens systems. Partly because of the inconvenience of manufacture, such teachings have not been commercially adopted to any great extent nor has much specific consideration been given to the use of aspherical surfaces in correcting other aberrations—particularly distortion.

The manufacturing difficulties were overcome for all practical purposes except those in which the utmost precision is required, by the development of machines for molding lenses of glass and plastic materials. Such machines are well known and have been in general use for many years for example in the making of roadside reflector buttons and the field lens of so-called "brilliant" finders for cameras.

According to the invention a highly corrected view finder substantially free from distortion is made up using only two lens elements, a simple positive eye-piece and a simple negative front component having for at least one refracting surface an aspherical surface as described in detail below. The simplicity of such an optical system is one of its more important advantages over the complex systems wherein additional surfaces are introduced to correct the distortion and other aberrations. However, in the cases where additional elements have been included merely to permit adjustment of the field of view, the present invention may also well be employed to reduce distortion. In the preferred embodiment of the invention, the front component is made up of pressed or otherwise molded plastic material so that the use of an aspherical surface presents no insoluble manufacturing problem.

Other objects and advantages of the invention will be apparent from the following detailed description when read in connection with the accompanying drawings in which:

Fig. 1 diagrammatically shows a view finder employing the invention.

Figs. 4A and 4B show modifications of the invention wherein the front surface of the front component is spherically curved to a relatively high degree.

Figs. 5A and 5B illustrate the mathematical derivation of the general equation for the aspheric surface of these modifications.

Fig. 6 shows typical graphs of distortion vs. the eccentricity of the aspheric curves for particular plano concave, biconcave and meniscus examples.

Fig. 7 shows one typical curve for distortionless systems as the front component is bent.

Although some axial movement of the eye is permissible with a view finder made up according to the invention, I have found that the correction of distortion is obtainable most conveniently when only a unique axial position is possible for the observer's eye. Expressing it in other words, I find that the invention can be most clearly explained and claimed by considering that the observer's eye must be substantially at a given axial position—it being understood that a certain amount of latitude is permissible in the choice of this position.

Figure 1:
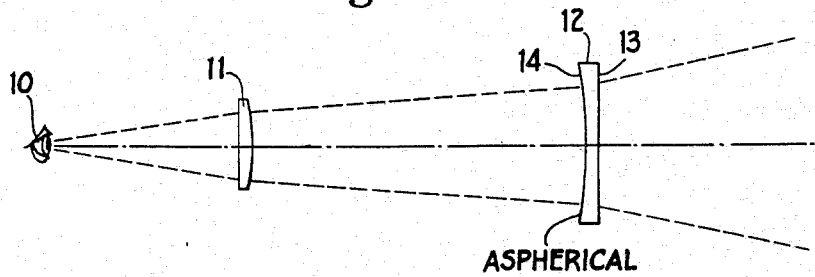
Figure 2:
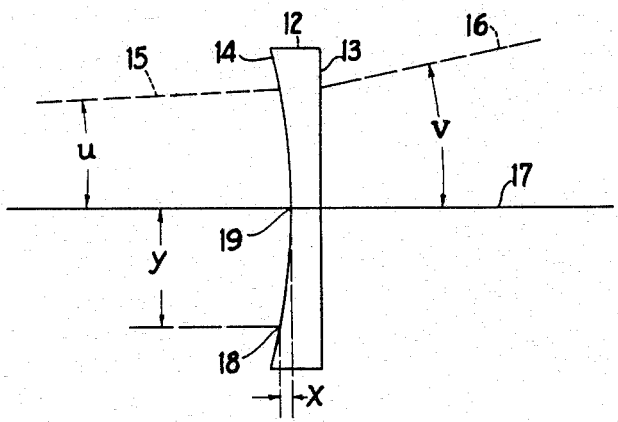
Fig. 2 is a detailed drawing of the front component of the view finder shown in Fig. 1.

In Figs. 1 and 2, similar reference numerals refer to similar details. The embodiment shown consists of a view finder comprising a positive eye-piece 11 positioned just in front of the observer's eye 10 and an aspheric negative front component having a plano surface 13 and an aspheric surface 14, shaped to eliminate distortion from the system.

The exact shape of this surface 14 may best be described by considering a bundle of rays converging to the eye of the observer at a fixed axial distance from the front component, say 4 or 4½ inches in the embodiment shown. Because of the collective element 11 the actual distance of the eye 10 from the front component 12 is, of course, somewhat less than this effective distance, which is the one considered here. The light ray 15 shown in Fig. 2 is one of the bundle of rays converging to the observer's eye, this particular ray 15 being at an angle U to the optic axis of the system. The broken line 16 indicates this same ray prior to incidence upon the negative component 12 and is at an angle V to the optic axis of the system.

To eliminate distortion the front component 12 must be so shaped that it fulfills the tangent condition for all rays converging to the observer's eye, namely $$\frac{\tan V}{\tan U} = \text{a constant}$$

I prefer to use a plano concave front component as shown, but, of course, the surface 13 may be curved either spherically or aspherically if desired. At least one of the surfaces of this component must be aspheric if the tangent condition is to be fulfilled. To define the curvature of this aspheric surface 14, I employ Cartesian coordinates X and Y for any point 18 on the surface with respect to an origin 19 at the center of this surface.

The exact shape of the curve from which the surface is, of course, generated by revolution about the optic axis, may be expressed as an equation embodying these Cartesian coordinates and depends on the index of refraction for the glass and whether or not the front surface 13 is also curved. The following data relates to two arrangements of a plano concave component made according to the invention. The second set of data is a somewhat closer approximation to the mathematically ideal surface, but either set of specifications gives a component which is satisfactory from a practical point of view.

1. *Corresponding to a spherical surface of 8.50 mm. radius. Index of refraction $N_D=1.520$. Equation of curve $Y^2=14.04X$. Radius of curvature at vertex 7.02 mm.*

| $Y=$ | 0.50 mm. | 1.00 | 1.50 | 2.00 | 2.50 | 3.00 |
|---|---|---|---|---|---|---|
| $X=$ | .018 mm. | .071 | .160 | .285 | .445 | .640 |
| $Y=$ | 3.50 | 4.00 | 4.50 | 5.00 | 5.50 | 6.00 |
| $X=$ | .874 | 1.140 | 1.442 | 1.780 | 2.150 | 2.555 |

2. *Corresponding to a spherical surface of 11.7 mm. radius. Index of refraction $N_D=1.520$. Equation of curve*

$$X=\frac{Y^2}{21}+\frac{Y^4}{65500}$$

| $Y=$ | 0.50 mm. | 1.00 | 1.50 | 2.00 | 2.50 | 3.00 | 3.50 |
|---|---|---|---|---|---|---|---|
| $X=$ | .012 | .048 | .107 | .190 | .298 | .430 | .585 |
| $Y=$ | 4.00 | 4.50 | 5.00 | 5.50 | 6.00 | 6.50 | 7.00 |
| $X=$ | .766 | .971 | 1.199 | 1.454 | 1.734 | 2.039 | 2.370 |
| $Y=$ | 7.50 | 8.00 | 8.50 | 9.00 | 9.50 | 10.00 | |
| $X=$ | 2.726 | 3.109 | 3.519 | 3.957 | 4.421 | 4.913 | |

By way of illustration of the use of the tangent condition described above, let us consider a plano concave element as shown in Fig. 2 and made up according to the first set of specifications with respect to an observer's eye at an effective distance of four inches. Tracing rays trigonometrically, we get:

| U | | V | | Tan V/Tan U |
|---|---|---|---|---|
| Degrees | Minutes | Degrees | Minutes | |
| 0 | 30 | 3 | 59 | 8.00 |
| 1 | 0 | 7 | 58 | 8.00 |
| 1 | 30 | 11 | 50 | 8.00 |
| 2 | 0 | 15 | 36 | 8.00 |
| 2 | 30 | 19 | 17 | 8.00 |
| 3 | 0 | 22 | 45 | 8.00 |
| 3 | 30 | 26 | 7 | 8.00 |
| 4 | 0 | 29 | 13 | 8.00 |

Making a similar set of computations for the second set of specifications and an eye distance of 4½ inches we get:

| U | | V | | Tan V/Tan U |
|---|---|---|---|---|
| Degrees | Minutes | Degrees | Minutes | |
| 0 | 30 | 3 | 12 | 6.26 |
| 1 | 0 | 6 | 36 | 6.26 |
| 1 | 30 | 9 | 50 | 6.26 |
| 2 | 0 | 13 | 1 | 6.26 |
| 2 | 30 | 16 | 8 | 6.26 |
| 3 | 0 | 19 | 9 | 6.26 |
| 3 | 30 | 22 | 3 | 6.26 |
| 4 | 0 | 24 | 51 | 6.26 |

It will be seen that in both of these cases the tangent condition is fulfilled with sufficient accuracy for all practical purposes. The fulfilling of this tangent condition gives a view finder system substantially free of distortion.

As pointed out above I have found by cut and try methods that a parabola generating curve which "corresponds" to a certain circle (spherical surface) gives a surface which satisfies the tangent condition. This is approximately true for all such lenses which might be used in a view finder of this type. The degree to which the distortion is corrected by a parabola depends on the power of the lens and the covering power of the system as well as whether or not the front surface is curved or plano.

The "correspondence" between the aspheric and spheric surfaces referred to in the above tables is of course, correspondence in view finding power, i. e. covering power. For convenience, since the aperture of a view finder is usually rectangular I define the covering power in terms of the angle ($2v$ in Fig. 2) subtended through the middle points of the vertical sides of the aperture, i. e. the "horizontal covering power." Since an aspheric and a spheric surface match in covering power in one marginal zone only, the actual value of the radius of the "corresponding" spherical surface depends on what convention is followed in defining covering power, but any convention, if adhered to, will serve for the present invention. I chose the "horizontal" rather than the vertical or diagonal covering power merely for convenience.

To aid in describing this invention in the accompanying claims, the mathematical framework giving the above equations will now be outlined. Since the invention is in the form of an improvement in known finders of the positive-eyepiece, negative-front-component type, it is best described in relation to such finders. Each system according to my invention corresponds to some ordinary view finder in which the rear surface of the front component is spherical as shown in Fig. 3 by the broken line 14' preferably convex to the incident light with a radius of curvature $r$ and the front surface 13 is plano, is substantially plano or as in Figs. 4A and 4B is spherical.

Figure 3:
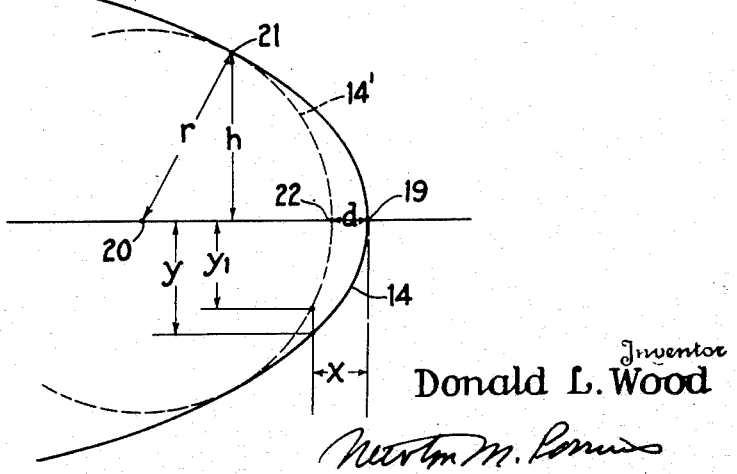
Fig. 3 illustrates the mathematical derivation of the equation for the aspheric surface of this front component.

In Fig. 3, the effective diaphragm width measured horizontally at the rear surface of the front component is $2h$. When the actual diaphragm is positioned in front of this component its diameter is slightly greater than $2h$ as is obvious from the path of the marginal ray shown in Fig. 2. Since $h$ is the same whether measured for the aspheric or the spheric curve, and since the surface at this marginal point 21 must have exactly the same bending effect on the rays whether it is aspheric or spheric (in order to have the same covering power) the two surfaces must be tangential.

As pointed out above, I have found that when the front surface of this front component is plano or substantially so, its rear surface must as a first approximation be a paraboloid generated by a parabola 14. To have the same covering power as the (sphere) circle 14', the two curves must be tangential at $y=h$.

Parabola 14 has the equation:

$$x=\frac{y^2}{A}$$

By differentiation its slope is:

$$\frac{dx}{dy} = \frac{2y}{A}$$

Therefore at $y=h$ its slope is $$\frac{2h}{A}$$

The circle $14'$ has the equation $$r^2 = y_1^2 + (r+d-x)^2$$

where $r$ is its radius and $d$ is the axial spacing of the two curves, i. e. the distance between the points 19 and 22. The center of the circle $14'$ is at 20.

By differentiation its slope is:

$$\frac{dx}{dy^1} = \frac{y_1}{\sqrt{r^2 - y_1^2}}$$

which equals $$\frac{h}{\sqrt{r^2 - h^2}}$$

at $y_1 = h$.

Since the two curves must be tangential at $y = y_1 = h$, their slopes must be equal at this point; therefore $$A = 2\sqrt{r^2 - h^2}$$

Therefore as a first approximation a parabola whose equation is:

$$x = \frac{y^2}{2\sqrt{r^2 - h^2}}$$

will according to my invention give a surface which together with a plano or substantially plano front surface will satisfy the tangent condition giving a distortion free system.

As a second approximation the equation should be $$x = \frac{y^2}{2\sqrt{r^2 - h^2}} + \frac{y^4}{B}$$

where B is very large, on the order of 3000 times $$2\sqrt{r^2 - h^2}$$

i. e. between $$1000\sqrt{r^2 - h^2}$$

and $$10{,}000\sqrt{r^2 - h^2}$$

The above equations are strictly accurate only for the embodiment of my invention wherein the front surface of the front component is plano or substantially so. That is, my invention consists in showing which surface of a finder of the negative - front - component - positive - eyepiece type should be made aspheric and how this surface should be different from a sphere i. e. flattened at the margins. More specifically the surface should be the paraboloid defined by the above equation (or a slight modification thereof.) This paraboloid gives a high degree of correction even when the front surface is curved.

Fig. 4A shows an embodiment of the invention wherein the front component 23 is meniscus having a spherical front surface 24 and an aspherical rear surface 25 which is flattened toward the margins. A paraboloid as discussed above gives a fair degree of approximation, but for certain values of the radius of curvature of the front surface, a hyperboloid is even better.

Fig. 5A is an exaggerated view of the front component of Fig. 4A. Let R be the radius of curvature of the front surface 24; as before, let $r$ be the radius of curvature corresponding to (i. e. marginally tangent to) the rear surface 25, i. e. the radius of curvature of the circle shown by the broken line $25'$. Thus a lens bounded by the surfaces 24 and $25'$ would be the spherical one corresponding to the lens 23. Bending this lens $24$—$25'$ to a plano concave lens, one gets a lens shown by the broken lines 33 and 34 wherein the radius of curvature of the surface 34 is $r_1$. This is merely a definition of $r_1$. If the so called corresponding lens is plano concave as in Fig. 1, $r_1$ equals $r$. The circle $25'$ intersects the axis at 32 and is tangent to the aspherical curve 25 at the margin 31. Its center of curvature is shown at 30. The surface 25 intersects the axis at the point 29.

After trying several equations for a general conic which will be a hyperbola for this meniscus case and will degenerate to the parabola $$x = \frac{y^2}{2\sqrt{r^2 - h^2}}$$

for the plano concave case, it has been found that:

$$x = \frac{y^2 r_1}{2r\sqrt{r_1^2 - h^2}} + \frac{x^2(r_1^2 - r^2)}{2rr_1\sqrt{r_1^2 - h^2}}$$

gives an aspheric surface which corrects distortion and which is only slightly different from the paraboloid when $r_1$ is only slightly different from $r$.

Figs. 4B and 5B illustrate the same derivation for the biconcave case where the front component 26 has a spherical front surface 27 and an elliptical rear surface 28 corresponding to a spherical surface $28'$ which bends to the broken curve 35 when the front surface is plano as shown by the broken line 33.

The same general equation has been found by trial to hold in this case also. The range over which this equation holds includes practically all commercially useful cases from a not too highly bent meniscus to a biconcave in which the front surface is more highly curved than the rear.

The effect of using a conicoid on the rear surface is illustrated roughly by Fig. 6 in which distortion is plotted against the conicoid used for three particular examples. It will be seen that in the plano concave case, the change from a sphere to a paraboloid reduces the distortion from plus 10% to minus .5% and an ellipse only slightly different from a parabola gives zero distortion. These curves are only illustrative and are different for every lens system. The above general equation can be modified slightly to reduce to a parabola for a slightly meniscus lens as suggested by these curves, rather than for the strictly plano concave case, but the degree of improvement gained thereby is generally negligible in practical cases.

Fig. 7 shows a curve for a distortionless system, showing what conicoid must be used on the rear surface for each value of R, (the radius of curvature of the front surface.) This curve is also only illustrative since each system has a different curve. A curve of this type is plotted from cut and try tests, checking by tracing rays to see if the tangent condition is satisfied. Each point on the curve represents a lens element differing from the others by "bending" in the well known optical sense. The exact shape of this curve depends on the power of this lens element and possibly other factors. The curve given by the general equation outlined above practically coincides with this experimental curve over a considerable range on either side of the "plano" axis. A more exact general equation can be developed taking this curve as a starting point for a relationship between eccentricity, curvature and magnifying power which equation would of course be correct over a range even greater than the general equation given. These general equations provide only slight improvements over the paraboloid and modified paraboloid described in connection with Fig. 1.

Having thus described several embodiments of my invention, I wish to point out that the invention is not limited to these examples, but is of the scope of the appended claims.

What I claim and desire to secure by Letters Patent of the United States is:

1. A view finder system consisting of a positive eye-piece and a negative front component mutually spaced in view finder relation, said front component having an aspherically shaped rear surface which is concave to the eyepiece and which has a marginal curvature slightly less than its paraxial curvature to reduce distortion.

2. A view finder system consisting of a positive eyepiece spaced thereform in view finder relation and a negative front component whose front surface is substantially plano and whose rear surface is concave to the eyepiece and is substantially a conicoid whose marginal curvature is slightly less than its paraxial curvature to reduce distortion.

3. A view finder system consisting of a positive eyepiece and a negative front component spaced axially in telescopic relation, the negative front component consisting of a single element whose rear surface is convex to the incident light, is more highly curved than the front surface and is substantially a paraboloid of revolution about the optic axis of the system.

4. A distortionless view finder system comprising a positive eyepiece and a negative front component spaced in view finder relation, the rear surface of the front component being concave to the eyepiece and aspheric substantially according to the equation $$x = \frac{y^2}{2\sqrt{r^2 - h^2}}$$

where $x$ is measured axially from the point of interception of this surface with the optic axis of the system, $y$ is measured radially from the optic axis, $h$ is one-half of the width of the aperture-diaphragm of the system measured at this rear surface and $r$ is the effective radius of curvature of this surface at a distance $h$ from the axis whereby the tangent condition for the front component is substantially satisfied said tangent condition being $$\frac{\tan V}{\tan U}$$

equals a constant where $V$ is the angle to the optic axis of a transmitted ray prior to incidence upon the negative component and $U$ is the angle after passing through the negative component.

5. A distortionless view finder system comprising a positive eyepiece and a negative front component spaced in view finder relation, the rear surface of the front component being concave to the eyepiece and aspheric substantially according to the equation $$x = \frac{y^2}{2\sqrt{r^2 - h^2}} + \frac{y^4}{B}$$

where $x$ is measured axially from the point of interception of this surface with the optic axis of the system, $y$ is measured radially from the optic axis, $h$ is one-half of the width of the aperture-diaphragm of the system measured at this rear surface, $r$ is the effective radius of curvature of this system at a distance $h$ from the axis and $B$ is a large constant between $$1000\sqrt{r^2 - h^2} \text{ and } 10000\sqrt{r^2 - h^2}$$

whereby the tangent condition for the front component is substantially satisfied said tangent condition being $$\frac{\tan V}{\tan U}$$

equals a constant where $V$ is the angle to the optic axis of a transmitted ray prior to incidence upon the negative component and $U$ is the angle after passing through the negative component.

DONALD L. WOOD.